United States Patent
Si et al.

(10) Patent No.: US 8,619,407 B2
(45) Date of Patent: Dec. 31, 2013

(54) MULTILAYERED CERAMIC CAPACITOR

(75) Inventors: Tae Sung Si, Gyunggi-do (KR); Kyung Nam Hwang, Gyunggi-do (KR); Sang Mi Lee, Seoul (KR); Jong Hoon Bae, Gyunggi-do (KR)

(73) Assignee: Samsung Electro-Mechanics Co., Ltd, Suwon, Gyunggi-Do (KR)

( * ) Notice: Subject to any disclaimer, the term of this patent is extended or adjusted under 35 U.S.C. 154(b) by 173 days.

(21) Appl. No.: 13/024,706

(22) Filed: Feb. 10, 2011

(65) Prior Publication Data

US 2012/0134067 A1    May 31, 2012

(30) Foreign Application Priority Data

Nov. 25, 2010  (KR) .................. 10-2010-0118140

(51) Int. Cl.
*H01G 4/06* (2006.01)
*H01G 4/30* (2006.01)
*H01G 4/005* (2006.01)
*H01G 4/228* (2006.01)

(52) U.S. Cl.
USPC .............. 361/321.2; 361/301.4; 361/303; 361/306.1; 361/321.3

(58) Field of Classification Search
USPC .......... 361/303, 301.4, 321.3, 321.2, 306.1
See application file for complete search history.

(56) References Cited

U.S. PATENT DOCUMENTS

| | | | |
|---|---|---|---|
| 7,324,327 B2 * | 1/2008 | Togashi ............ | 361/321.2 |
| 2003/0099083 A1 * | 5/2003 | Ohtsuka et al. ....... | 361/303 |
| 2004/0027787 A1 * | 2/2004 | Yamauchi et al. ..... | 361/321.2 |
| 2007/0211405 A1 | 9/2007 | Togashi | |
| 2009/0103237 A1 | 4/2009 | Nagamiya | |
| 2009/0310277 A1 * | 12/2009 | Kayatani et al. ...... | 361/306.3 |
| 2010/0003397 A1 | 1/2010 | Sakanaka | |

FOREIGN PATENT DOCUMENTS

| | | |
|---|---|---|
| JP | 2000-252165 A | 9/2000 |
| JP | 2003-272945 A | 9/2003 |
| JP | 2007-242801 A | 9/2007 |
| JP | 2009-004734 | 1/2009 |
| JP | 2009-099826 A | 5/2009 |
| JP | 2010-016101 A | 1/2010 |
| KR | 10-130868 B1 | 5/1998 |
| KR | 10-2001-0112629 | 12/2001 |
| KR | 10-2005-0089493 A | 9/2005 |

OTHER PUBLICATIONS

Korean Office Action, w/ English translation thereof, issued in Korean Patent Application No. 10-2010-0118140, dated Dec. 6, 2011.

Japanese Office Action, and English translation thereof, issued in Japanese Patent Application No. 2011-022094 dated Aug. 7, 2012.

\* cited by examiner

*Primary Examiner* — Eric Thomas
*Assistant Examiner* — Arun Ramaswamy
(74) *Attorney, Agent, or Firm* — McDermott Will & Emery LLP (57) ABSTRACT

There is provided a multilayered ceramic capacitor capable of being implementing as a micro supercapacitor capable of minimizing a mounting area and increasing a mounting efficiency thereof. The multilayered ceramic capacitor includes a capacitor body in which a plurality of dielectric layers having a size of 1.6 mm in length and 0.8 mm in width are stacked; an internal electrode unit having a plurality of internal electrodes arranged on each of the plurality of dielectric layers; and an external electrode unit, having a plurality of external electrodes horizontally arranged in the capacitor body and electrically connected to the internal electrodes.

22 Claims, 7 Drawing Sheets

FIG. 6

MULTILAYERED CERAMIC CAPACITOR

CROSS-REFERENCE TO RELATED APPLICATIONS

This application claims the priority of Korean Patent Application No. 10-2010-0118140 filed on Nov. 25, 2010, in the Korean Intellectual Property Office, the disclosure of which is incorporated herein by reference.

BACKGROUND OF THE INVENTION

1. Field of the Invention

The present invention relates to a multilayered ceramic capacitor, and more particularly, to a multilayered ceramic capacitor capable of being implemented as a micro supercapacitor by minimizing a required mounting area and increasing mounting efficiency.

2. Description of the Related Art

Generally, a multilayered ceramic capacitor (MLCC) has a structure in which internal electrodes are inserted between a plurality of dielectric layers. The multilayered ceramic capacitor has been widely used for various components within electronic devices, due to the advantages thereof, such as miniaturization, high capacity, easy mountability, and the like. In particular, the multilayered ceramic capacitor has been actively used as a decoupling capacitor, or the like, connected between a semiconductor chip and a power source in a power circuit such as a large scale integrated circuit (LSI) device, or the like.

A plurality of decoupling capacitors maybe used between the semiconductor chip and the power supply. However, due to demand for component miniaturization, lightness and the like, an array in which at least two capacitors having the same or a different power capacity are implemented as a single chip has been required. In addition, an array in which a plurality of general chips are implemented as a single chip has been required. In the multilayered ceramic capacitor formed of this array, in order to allow for high capacity while reducing the mounting area of the chip, various methods have been attempted to efficiently use the internal area of the array.

SUMMARY OF THE INVENTION

An aspect of the present invention provides a multilayered ceramic capacitor capable of being implemented as a micro supercapacitor by minimizing a mounting area and increasing a mounting efficiency thereof.

According to an aspect of the present invention, there is provided a multilayered ceramic capacitor, including: a capacitor body in which a plurality of dielectric layers having a size of 1.6 mm in length and 0.8 mm in width are stacked; an internal electrode unit having a plurality of internal electrodes arranged on each of the plurality of dielectric layers; and an external electrode unit, having a plurality of external electrodes horizontally arranged in the capacitor body and electrically connected to the internal electrodes.

The plurality of internal electrodes may include protrusions connected to the external electrodes.

Each dielectric layer of the plurality of dielectric layers is arranged with electrically independent first, second, third, and fourth internal electrodes disposed thereon, and the internal electrode unit includes a first internal electrode group including the first internal electrodes of each dielectric layer, a second internal electrode group including the second internal electrodes of each dielectric layer, a third internal electrode group including the third internal electrodes of each dielectric layer, and a fourth internal electrode group including the fourth internal electrodes of each dielectric layer.

The protrusions of the first to fourth internal electrodes of at least one of the plurality of dielectric layers may have a protrusion direction, opposite to a protrusion direction of protrusions of the first to fourth internal electrodes of adjacent dielectric layers.

The external electrodes may include a first external electrode group having the plurality of external electrodes horizontally arranged on one side surface of the capacitor body and a second external electrode group having the plurality of external electrodes arranged on the other side surface formed to be opposite to the one side surface of the capacitor body.

The first external electrode group may includes first to fourth external electrodes, each electrically connected to the protrusions of the first to fourth internal electrodes protruded in one direction of the first to fourth internal electrodes formed on the plurality of dielectric layers, and the second external group includes fifth to eighth external electrodes, each electrically connected to the protrusions of the first to fourth internal electrodes protruded in the other direction, opposite to the one direction of the first to fourth internal electrodes formed on the plurality of dielectric layers.

The first to fourth internal electrode groups may have capacitance of 1 uF±10% or more.

The distance between the first to fourth internal electrodes, each arranged on the plurality of dielectric layers maybe equal to or larger than half of the distance between the first or the fourth internal electrode and a vertical side surface of the dielectric layer and may be equal to or less than ⅔ of the distance between the first or the fourth internal electrode and the vertical side surface of the dielectric layer.

The protrusions of the internal electrodes may have a width larger than twice that of a distance from one side surfaces of the internal electrodes formed with the protrusions to the protrusions and less than four times thereof.

The protrusions of the internal electrodes may have a width of 0.1 mm or more and 0.2 mm or less. The length of the capacitor body may be 1.6 mm±0.1 mm, the width of the capacitor body may be 0.8 mm±0.1 mm, and the height of the capacitor body may be 0.5 mm±0.05 mm or more and 0.85 mm±0.1 mm or more. The external electrodes may have a width of 0.2 mm±0.05 mm or more and 0.25 mm±0.1 mm or less. The distance between the plurality of external electrodes may be 0.4 mm±0.05 mm and 0.5 mm±0.1 mm or less. The a center distance between adjacent external electrodes of the plurality of external electrodes may be 0.2 mm±0.05 mm or more and 0.25 mm±0.1 mm or less. The length from the end of the external electrodes formed on a top surface of the capacitor body to a side surface of the capacitor body may be 0.15 mm±0.1 mm or more and 0.25 mm±0.1 mm or less.

According to another aspect of the present invention, there is provided a multilayered ceramic capacitor, including: a capacitor body in which a plurality of dielectric layers having preset length and width are stacked; an internal electrode unit including a plurality of internal electrodes electrically independent from one another and arranged on each dielectric layer of the plurality of dielectric layers, the internal electrodes having an overlapping area between each of the plurality of internal electrodes on each of the dielectric layers and the internal electrodes of the adjacent dielectric layers forming a internal electrode group and the capacitance of each internal electrode group being 1 uF or more; and an external electrode unit having a plurality of external electrodes horizontally arranged in the capacitor body and electrically connected to the internal electrodes.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1A:
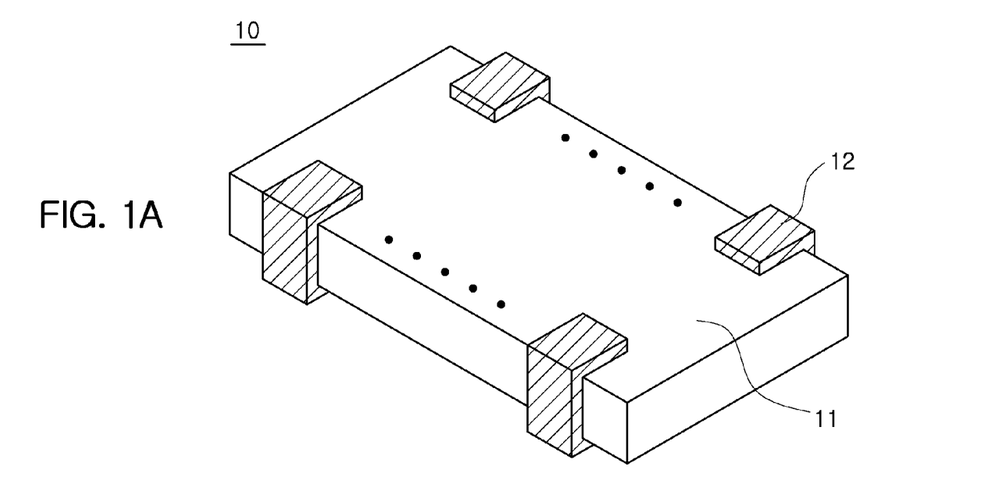
FIGS. 1A to 1C are, respectively, a perspective view, a plan view, and a side view of a multilayered ceramic capacitor according to an exemplary embodiment of the present invention.
Figure 1B:
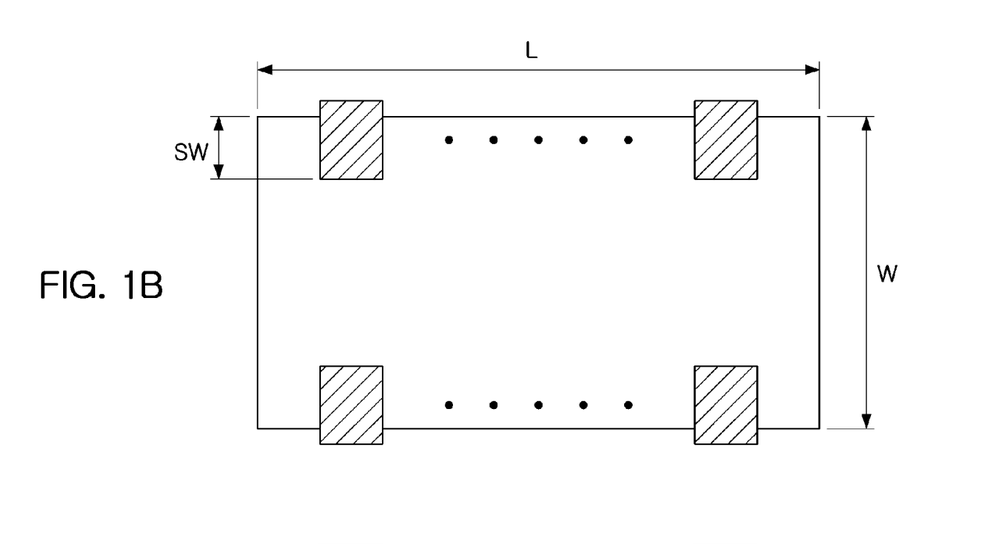
Figure 1C:
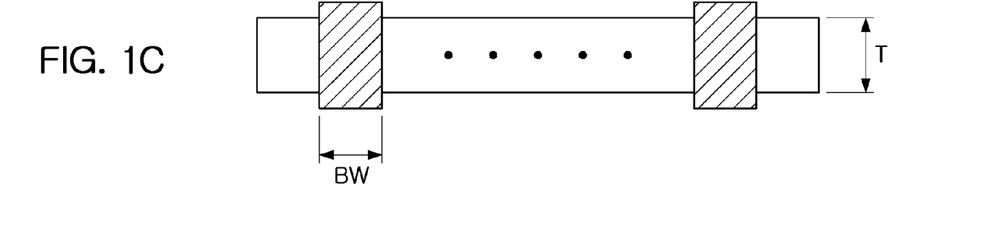
Figure 2:
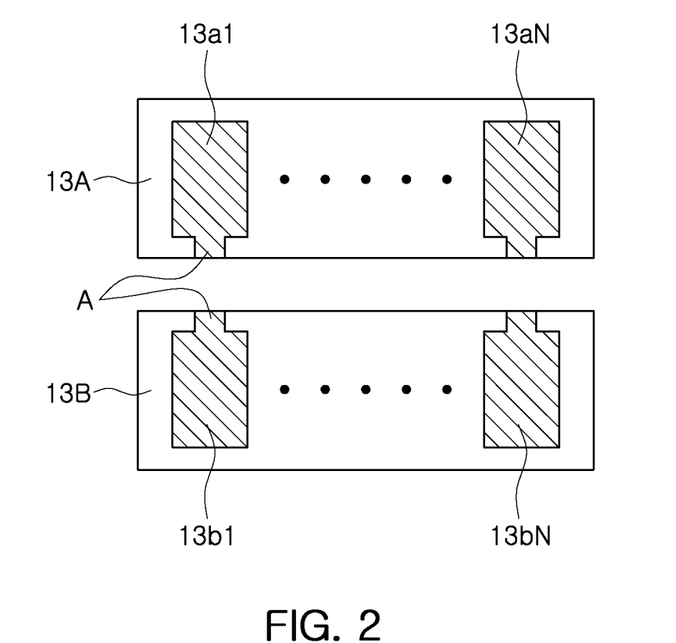
FIG. 2 is a diagram showing internal electrodes of the multilayered ceramic capacitor according to the exemplary embodiment of the present invention.
Figure 3:
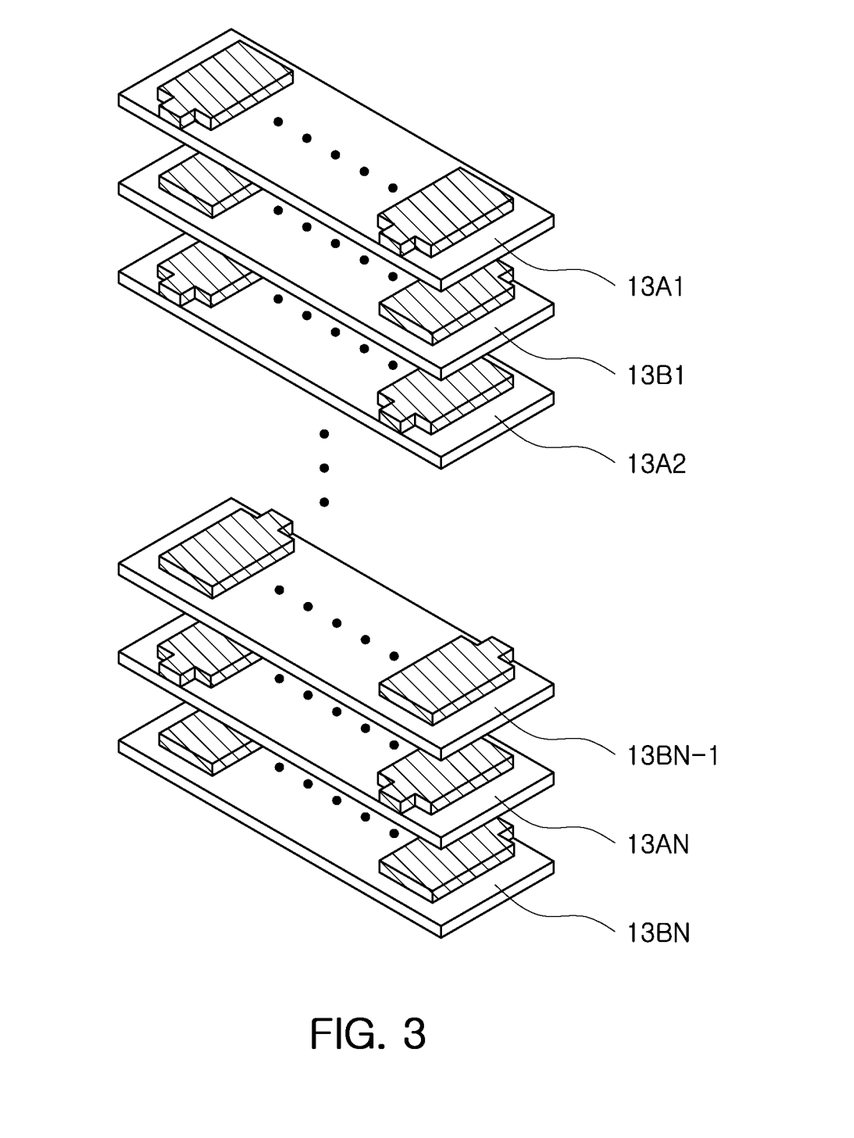
FIG. 3 is an exploded perspective view showing stacked internal electrodes of a multilayered ceramic capacitor according to an embodiment of the present invention.

FIGS. 1A to 1C are, respectively, a perspective view, a plan view, and a side view of a multilayered ceramic capacitor according to an exemplary embodiment of the present invention. FIG. 2 is a diagram showing internal electrodes of the multilayered ceramic capacitor according to the exemplary embodiment of the present invention. FIG. 3 is an exploded perspective view showing stacked internal electrodes of a multilayered ceramic capacitor according to an embodiment of the present invention.

Referring to FIGS. 1A to 1C, a multilayered ceramic capacitor 10 according to an exemplary embodiment of the present invention includes a capacitor body 11 having a predetermined width and length, and the outer surface of the capacitor body 11 may be provided with an outer electrode unit 12 mounted on a substrate and having an outer electrode electrically connected to other circuits. The length L of the capacitor body 11 may be 1.6 mm±0.1 mm, the width W thereof may be 0.8 mm±0.1 mm, and the height T thereof may be 0.5 mm±0.05 mm or more and 0.85 mm±0.1 mm or less.

The plurality of external electrodes of the external electrode units 12 may be horizontally arranged along the circumference of the capacitor body 11 and the width BW of the external electrodes arranged in the capacitor body 11 may be 0.2±0.05 mm or more and 0.25±0.1 mm or less. In addition, the plurality of external electrodes may be formed to the top surface or the bottom surface of the capacitor body 11 and a distance SW from an end of the external electrode formed to the top surface or the bottom surface of the capacitor body 11, to the side surface of the capacitor body 11 may be 0.15 mm±0.1 mm or more and 0.25±0.1 mm or less.

Referring to FIGS. 2 and 3, the inside of the capacitor body 11 may be provided with an internal electrode unit 13. The internal electrode unit 13 may include a plurality of stacked dielectric layers 13A1 to 13BN and each of the plurality of dielectric layers 13A1 to 13BN may have the plurality of internal electrodes 13$a$1 to 13$a$N and 13$b$1 to 13$b$N disposed thereon. In this configuration, the plurality of internal electrodes 13$a$1 to 13$a$N and 13$b$1 to 13$b$N may be arranged in a row.

The plurality of internal electrodes 13$a$1 to 13$a$N and 13$b$1 to 13$b$N may include protrusions A that can be electrically connected to the external electrodes.

The direction of the protrusions A of the plurality of internal electrodes 13$a$1 to 13$a$N arranged in the first dielectric layer 13A may be opposite to the direction of the protrusions A of the plurality of internal electrodes 13$b$1 to 13$b$N arranged in the second dielectric layer 13B stacked on the first dielectric layer 13A. As described above, the direction of the protrusions of the plurality of internal electrodes arranged on a single dielectric layer may be opposite to the direction the protrusions of the plurality of internal electrodes arranged on an adjacent dielectric layer.

The internal electrode unit 13 may have preset capacitance by overlapping at least some of the area between the plurality of internal electrodes arranged on each of the plurality of stacked dielectric layers 13A1 to 13BN and the plurality of internal electrodes of the adjacent dielectric layers.

Figure 4A:
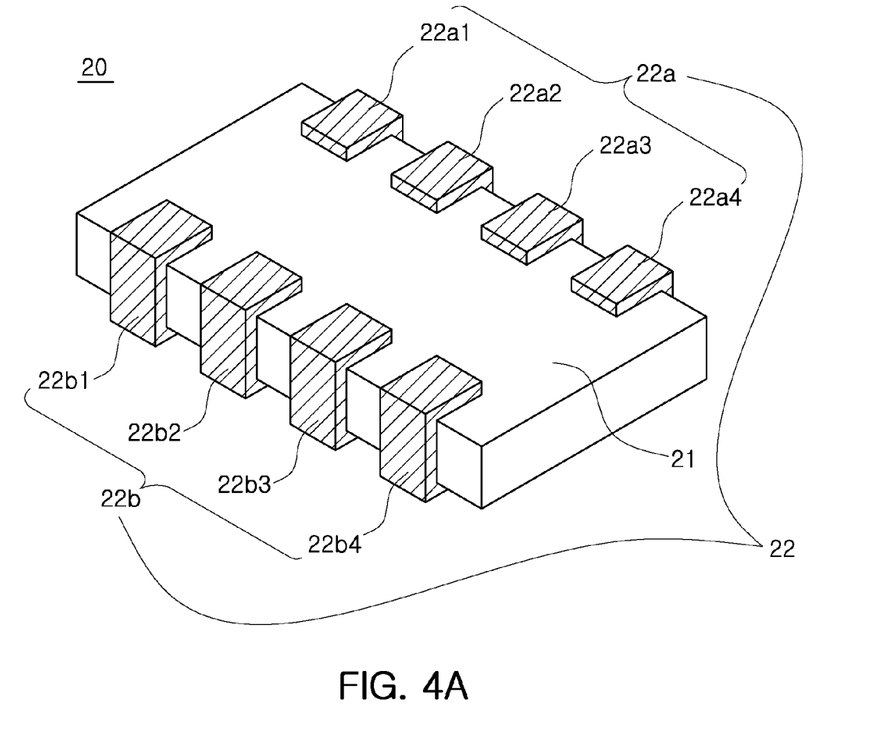
FIGS. 4A to 4C are, respectively, a perspective view, a plan view, and a side view of a multilayered ceramic capacitor according to an exemplary embodiment of the present invention.
Figure 4B:
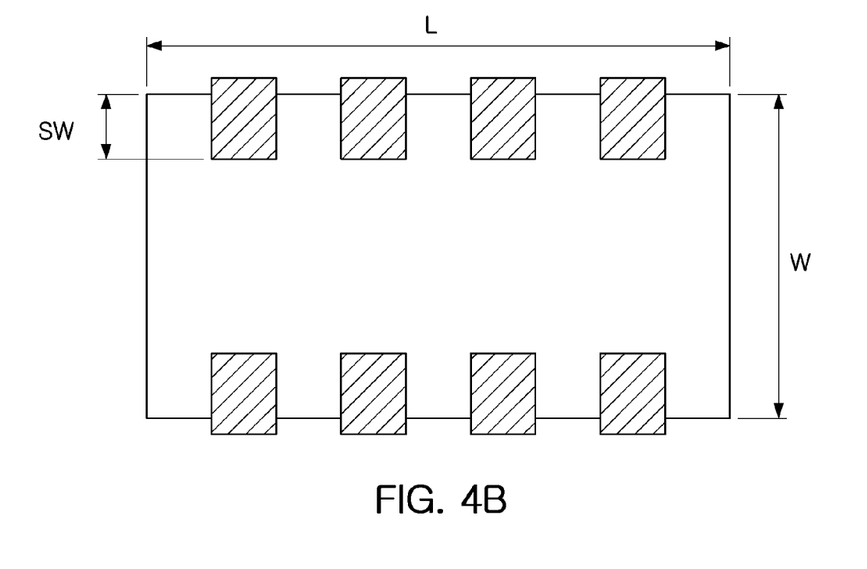
Figure 4C:
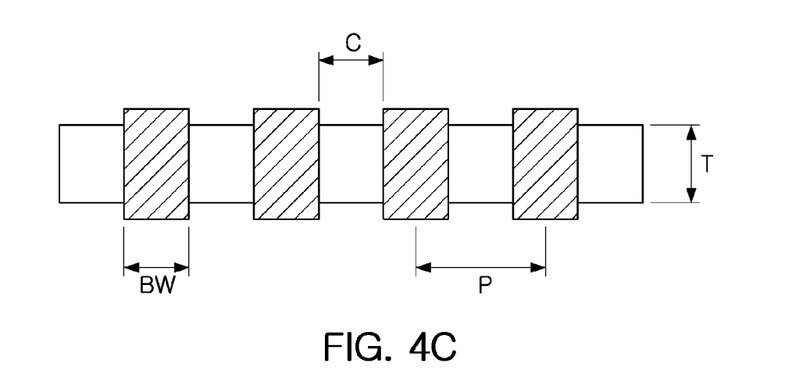
Figure 5:
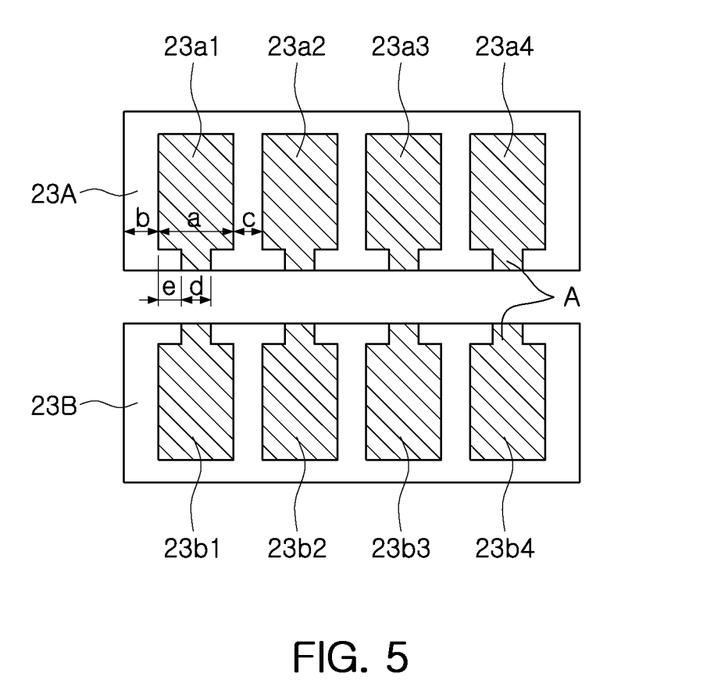
FIG. 5 is a diagram showing internal electrodes of the multilayered ceramic capacitor according to the exemplary embodiment of the present invention.
Figure 6:
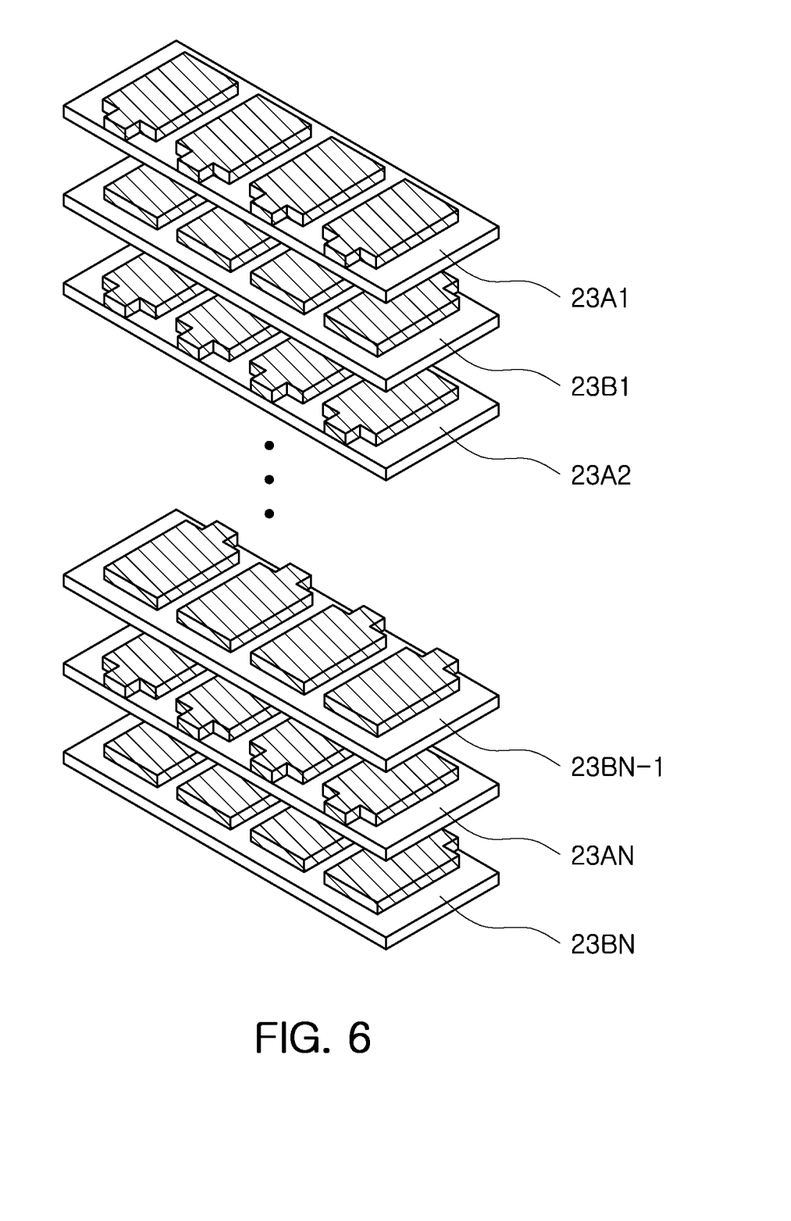
FIG. 6 is an exploded perspective view showing stacked internal electrodes of a multilayered ceramic capacitor according to an exemplary embodiment of the present invention.

FIGS. 4A to 4C are, respectively, a perspective view, a plan view, and a side view of a multilayered ceramic capacitor according to an exemplary embodiment of the present invention. FIG. 5 is a diagram showing internal electrodes of the multilayered ceramic capacitor according to the exemplary embodiment of the present invention. FIG. 6 is an exploded perspective view showing stacked internal electrodes of a multilayered ceramic capacitor according to an exemplary embodiment of the present invention.

Referring to FIGS. 4A to 4C, a multilayered ceramic capacitor 20 according to an exemplary embodiment of the present invention may include a capacitor body 21 in which a length L may be 1.6 mm±0.1 mm, a width W may be 0.8 mm±0.1 mm, and a height T may be 0.5 mm±0.05 mm or more and 0.85 mm±0.1mm or less, and an external electrode unit 22 including four external electrodes, each horizontally arranged in the capacitor body 21. That is, one of the side surface of the length of the capacitor body 21 may be provided with a first external electrode group 22$a$ having four external electrodes 22$a$1, 22$a$2, 22$a$3, and 22$a$4 arranged in a row and the other side surface, opposite to the one side surface of the length of the capacitor body 21 may be provided with a second external electrode group 22$b$ having four external electrodes 22$b$1, 22$b$2, 22$b$3, and 22$b$4 arranged in a row.

Similar to the description with reference to FIGS. 1B and 1C, referring to FIGS. 4B and 4C, the width BW of four external electrodes 22$a$1 to 22$b$4 arranged in the capacitor body may be 0.2±0.05 mm or more and 0.25±0.1 mm or less. In addition, the four external electrodes 22$a$1 to 22$b$4 may be formed to the top surface or the bottom surface of the capacitor body 21 and the distance SW from an end of the external electrode formed to the top surface or the bottom surface of the capacitor body 21 to the side surface of the capacitor body 21 may be 0.15 mm±0.1 mm or more and 0.25±0.1 mm or less. In addition, a distance C between the external electrodes may be 0.4 mm±0.05 mm or more and 0.5 mm±0.1 mm or less. Further, a distance P between the centers of the adjacent external electrodes among the four external electrodes may be 0.2 mm±0.05 mm or more and 0.25 mm±0.1 mm or less.

Similar to the description with reference to FIGS. 2 and 3, referring to FIGS. 5 and 6, the internal electrode unit 23 may include the plurality of stacked dielectric layers 23A1 to 23BN. Each of the plurality of dielectric layers 23A1 to 23BN may have the four internal electrodes 23a1 to 23a4 and 23b1 to 23b4 disposed thereon. In this case, the four internal electrodes 23a1 to 23a4 and 23b1 to 23b4 may be arranged in a row.

The four internal electrodes 23a1 to 23a4 and 23b1 to 23bN may include the protrusions A that may be electrically connected to the external electrodes.

The distance C between the first to fourth internal electrodes 23a1 to 23a4 and 23b1 to 23b4 arranged on each of the plurality of dielectric layers 23A1 to 23BN may be equal to or larger than half of the distance b between the first to fourth internal electrodes 23a1, 23a4, 23b1, and 23b4 and the vertical side surface of the dielectric layer and may be equal to or less than ⅔ of the distance b between the first to fourth internal electrodes 23a1, 23a4, 23b1, and 23b4 and the vertical side surface of the dielectric layer.

According to one technical aspect of the present invention, if the width d of the protrusion A of the internal electrode is less than twice that of the distance e from one side surface of the internal electrode formed with the protrusion A to the protrusion A, it is difficult to form contact between the internal electrodes and the external electrodes, and if the width d of the protrusion A of the internal electrode is less than four times that of the distance e from one side surface of the internal electrode formed with the protrusion A to the protrusion A, the external electrode may not cover the internal electrode, thereby causing contact defects. Similarly, if the width d of the protrusion A of the internal electrode is less than 0.1 mm, it is difficult to form contact between the internal electrode and the external electrode, and if the width of the protrusion A of the internal electrode is 0.2 mm or more, the external electrode may cover the internal electrode, thereby causing the contact defects. The width d of the protrusion A of the internal electrode maybe larger than twice that of the distance e from one side surface of the internal electrode to the protrusion A and may be less than four times thereof. Further, the width d of the protrusion A of the internal electrode may be 0.1 mm or more and 0.2 mm or less.

The area a of the internal electrode may be 190 um$^2$, so that a first internal electrode group including the first internal electrodes of each dielectric layer, a second internal electrode group including the second internal electrodes of each dielectric layer, a third internal electrode group including the third internal electrodes of each dielectric layer, and a fourth internal electrode group including the fourth internal electrodes of each dielectric layer, individually have a high capacitance of 1 uF±10% or more.

As described above, according to the present invention, the plurality of supercapacitors, in particular, four supercapacitors of 1 uF or more at 1608 size are integrated to minimize the mounting area and increase the mounting efficiency, thereby making it possible to implement the micro supercapacitor.

As set forth above, according to the embodiments of the present invention, there is provided the multilayered ceramic capacitor capable of implementing the micro supercapacitor by minimizing the mounting area and increasing the mounting efficiency.

While the present invention has been shown and described in connection with the exemplary embodiments, it will be apparent to those skilled in the art that modifications and variations can be made without departing from the spirit and scope of the invention as defined by the appended claims.

What is claimed is:

1. A multilayered ceramic capacitor, comprising:
a capacitor body in which a plurality of dielectric layers having a size of 1.6 mm in length and 0.8 mm in width are stacked;
an internal electrode unit having a plurality of internal electrodes arranged on each of the plurality of dielectric layers; and
an external electrode unit, having a plurality of external electrodes horizontally arranged in the capacitor body;
wherein the plurality of internal electrodes include protrusions connected to the external electrodes; and
wherein the protrusions of the internal electrodes have a width larger than twice that of a distance from one side surface of the internal electrodes formed with the protrusions to the protrusions and less than four times thereof,
wherein each dielectric layer of the plurality of dielectric layers is arranged with electrically independent first, second, third, and fourth internal electrodes disposed thereon,
the internal electrode unit includes a first internal electrode group including the first internal electrodes of each dielectric layer, a second internal electrode group including the second internal electrodes of each dielectric layer, a third internal electrode group including the third internal electrodes of each dielectric layer, and a fourth internal electrode group including the fourth internal electrodes of each dielectric layer, and
wherein an immediately adjacent distance between the first to fourth internal electrodes, each arranged on the plurality of dielectric layers is equal to or larger than half of an immediately adjacent distance between the first or the fourth internal electrode and a vertical side surface of the dielectric layer and is equal to or less than ⅔ of the immediately adjacent distance between the first or the fourth internal electrode and the vertical side surface of the dielectric layer.

2. The multilayered ceramic capacitor of claim 1, wherein the protrusions of the first to fourth internal electrodes of at least one of the plurality of dielectric layers have a protrusion direction, opposite to a protrusion direction of protrusions of the first to fourth internal electrodes of adjacent dielectric layers.

3. The multilayered ceramic capacitor of claim 2, wherein the external electrodes include a first external electrode group having the plurality of external electrodes horizontally arranged on one side surface of the capacitor body and a second external electrode group having the plurality of external electrodes arranged on the other side surface formed to be opposite to the one side surface of the capacitor body.

4. The multilayered ceramic capacitor of claim 3, wherein the first external electrode group includes first to fourth external electrodes, each of the first to fourth external electrodes electrically connected to corresponding protrusions of the first to fourth internal electrodes protruded in one direction of the first to fourth internal electrodes formed on the plurality of dielectric layers, respectively, and
the second external group includes fifth to eighth external electrodes, each of the fifth to eighth external electrodes electrically connected to corresponding protrusions of the first to fourth internal electrodes protruded in the other direction, opposite to the one direction of the first to fourth internal electrodes formed on the plurality of dielectric layers, respectively.

5. The multilayered ceramic capacitor of claim 1, wherein the first to fourth internal electrode groups has capacitance of 1 uF±10% or more.

6. The multilayered ceramic capacitor of claim 1, wherein the protrusions of the internal electrodes have a width of 0.1 mm or more and 0.2 mm or less.

7. The multilayered ceramic capacitor of claim 1, wherein the length of the capacitor body is 1.6 mm±0.1 mm, the width of the capacitor body is 0.8 mm±0.1 mm, and a height of the capacitor body is 0.5 mm±0.05 mm or more and 0.85 mm±0.1 mm or less.

8. The multilayered ceramic capacitor of claim 1, wherein the external electrodes have a width of 0.2 mm±0.05 mm or more and 0.25 mm±0.1 mm or less.

9. The multilayered ceramic capacitor of claim 1, wherein a distance between the plurality of external electrodes is 0.4 mm±0.05 mm and 0.5 mm±0.1 mm or less.

10. The multilayered ceramic capacitor of claim 1, wherein a center distance between adjacent external electrodes of the plurality of external electrodes is 0.2 mm±0.05 mm or more and 0.25 mm±0.1 mm or less.

11. The multilayered ceramic capacitor of claim 1, wherein a length from an end of the external electrodes formed on a top surface of the capacitor body to a side surface of the capacitor body is 0.15 mm±0.1 mm or more and 0.25 mm±0.1 mm or less.

12. A multilayered ceramic capacitor, comprising:
a capacitor body in which a plurality of dielectric layers having preset length and width are stacked;
an internal electrode unit including a plurality of internal electrodes electrically independent from one another and arranged on each dielectric layer of the plurality of dielectric layers, the internal electrodes having an overlapping area between each of the plurality of internal electrodes on each of the dielectric layers and the internal electrodes of the adjacent dielectric layers forming a internal electrode group and the capacitance of each internal electrode group being 1uF or more; and
an external electrode unit having a plurality of external electrodes horizontally arranged in the capacitor body and electrically connected to the internal electrodes;
wherein the plurality of internal electrodes include protrusions connected to the external electrodes; and
wherein the protrusions of the internal electrodes have a width larger than twice that of a distance from one side surface of the internal electrodes formed with the protrusions to the protrusions and less than four times thereof,
wherein each dielectric layer of the plurality of dielectric layers is arranged with electrically independent first, second, third, and fourth internal electrodes disposed thereon,
the internal electrode unit includes a first internal electrode group including the first internal electrodes of each dielectric layer, a second internal electrode group including the second internal electrodes of each dielectric layer, a third internal electrode group including the third internal electrodes of each dielectric layer, and a fourth internal electrode group including the fourth internal electrodes of each dielectric layer, and
wherein an immediately adjacent distance between the first to fourth internal electrodes, each arranged on the plurality of dielectric layers is equal to or larger than half of an immediately adjacent distance between the first or the fourth internal electrode and a vertical side surface of the dielectric layer and is equal to or less than ⅔ of the immediately adjacent distance between the first or the fourth internal electrode and the vertical side surface of the dielectric layer.

13. The multilayered ceramic capacitor of claim 12, wherein the protrusions of the first to fourth internal electrodes of at least one of the plurality of dielectric layers have a protrusion direction, opposite to a protrusion direction of protrusions of the first to fourth internal electrodes of adjacent dielectric layers.

14. The multilayered ceramic capacitor of claim 12, wherein the external electrodes include a first external electrode group having the plurality of external electrodes horizontally arranged on one side surface of the capacitor body and a second external electrode group having the plurality of external electrodes arranged on the other side surface formed to be opposite to the one side surface of the capacitor body.

15. The multilayered ceramic capacitor of claim 14, wherein the first external electrode group includes first to fourth external electrodes, each of the first to fourth external electrodes electrically connected to corresponding protrusions of the first to fourth internal electrodes protruded in one direction of the first to fourth internal electrodes formed on the plurality of dielectric layers, respectively, and
the second external group includes fifth to eighth external electrodes, each of the fifth to eighth external electrodes electrically connected to corresponding protrusions of the first to fourth internal electrodes protruded in the other direction, opposite to the one direction of the first to fourth internal electrodes formed on the plurality of dielectric layers, respectively.

16. The multilayered ceramic capacitor of claim 12, wherein the protrusions of the internal electrodes have a width of 0.1 mm or more and 0.2 mm or less.

17. The multilayered ceramic capacitor of claim 12, wherein the length of the capacitor body is 1.6 mm±0.1 mm, the width of the capacitor body is 0.8 mm±0.1 mm, and a height of the capacitor body is 0.5 mm±0.05 mm or more and 0.85 mm±0.1 mm or less.

18. The multi layered ceramic capacitor of claim 12, wherein the external electrodes have a width of 0.2 mm±0.05 mm or more and 0.25 mm±0.1 mm or less.

19. The multilayered ceramic capacitor of claim 12, wherein a distance between the plurality of external electrodes is 0.4 mm±0.05 mm and 0.5 mm±0.1 mm or less.

20. The multilayered ceramic capacitor of claim 12, wherein a center distance between the adjacent external electrodes of the plurality of external electrodes is 0.2 mm±0.05 mm or more and 0.25 mm±0.1 mm or less.

21. The multilayered ceramic capacitor of claim 12, wherein a length from an end of the external electrodes formed on a top surface of the capacitor body to a side surface of the capacitor body is 0.15 mm±0.1 mm or more and 0.25 mm±0.1 mm or less.

22. The multilayered ceramic capacitor of claim 12, wherein the capacitance of each of the internal electrode groups is 1 uF±10%.

* * * * *